(12) United States Patent
Sakanashi et al.

(10) Patent No.: US 9,618,676 B2
(45) Date of Patent: Apr. 11, 2017

(54) RING-SHAPED LIGHT-CONDUCTING APPARATUS WITH UNIFORM LUMINANCE

(71) Applicant: KOJIMA INDUSTRIES CORPORATION, Toyota-shi, Aichi (JP)

(72) Inventors: Katsutoshi Sakanashi, Toyota (JP); Tomoya Une, Toyota (JP); Hirokazu Kandori, Toyota (JP)

(73) Assignee: KOJIMA INDUSTRIES CORPORATION, Toyota-Shi (JP)

( * ) Notice: Subject to any disclaimer, the term of this patent is extended or adjusted under 35 U.S.C. 154(b) by 0 days.

(21) Appl. No.: 14/435,215

(22) PCT Filed: Oct. 10, 2013

(86) PCT No.: PCT/JP2013/077572
§ 371 (c)(1),
(2) Date: Apr. 13, 2015

(87) PCT Pub. No.: WO2014/061541
PCT Pub. Date: Apr. 24, 2014

(65) Prior Publication Data
US 2015/0253481 A1    Sep. 10, 2015

(30) Foreign Application Priority Data
Oct. 15, 2012  (JP) .................................. 2012-227635

(51) Int. Cl.
*F21V 7/04*      (2006.01)
*F21V 8/00*      (2006.01)
(Continued)

(52) U.S. Cl.
CPC .............. *G02B 6/002* (2013.01); *B60K 37/02* (2013.01); *B60N 3/10* (2013.01); *B60Q 3/004* (2013.01);
(Continued)

(58) Field of Classification Search
CPC .... B60K 2350/206; B60K 37/02; B60N 3/10; B60Q 3/004; B60Q 3/0243; G02B 6/00; G02B 6/001; G02B 6/0045
(Continued)

(56) References Cited

U.S. PATENT DOCUMENTS

| 6,880,945 B2 * | 4/2005 | Knaack ................ B60Q 1/0052 |
| | | 362/507 |
| 2011/0157899 A1 * | 6/2011 | Ko ........................ G02B 6/0061 |
| | | 362/307 |

FOREIGN PATENT DOCUMENTS

| JP | 2527183 Y2 | 2/1997 |
| JP | 2001060410 A | 3/2001 |

(Continued)

*Primary Examiner* — Anh Mai
*Assistant Examiner* — Hana Featherly
(74) *Attorney, Agent, or Firm* — Andrews Kurth Kenyon LLP

(57) ABSTRACT

A light-conducting apparatus includes a light source, a light-conducting member and a light-reflecting structure. The light-conducting member includes a ring-shaped portion, a light-receiving surface and a radially outwardly bulged portion. The ring-shaped portion extends continuously over an entire circumference of the ring-shaped portion in a circumferential direction of the ring-shaped portion. The light-receiving surface causes light from the light source to enter the light-conducting member through the light-receiving surface. The radially outwardly bulged portion is bulged radially outwardly from the ring-shaped portion and causes the light having entered the light-conducting member through the light-receiving surface to enter the ring-shaped portion in one direction in the circumferential direction of the ring-shaped portion. The light-reflecting structure reflects a portion of the light having entered the light-conducting member through the light-receiving surface and causes the reflected light to enter the ring-shaped portion in
(Continued)

a direction opposite to the one direction in the circumferential direction of the ring-shaped portion.

7 Claims, 4 Drawing Sheets

(51) Int. Cl.
- *B60Q 3/00* (2017.01)
- *B60Q 3/02* (2006.01)
- *B60N 3/10* (2006.01)
- *B60K 37/02* (2006.01)

(52) U.S. Cl.
CPC ........... *B60Q 3/0243* (2013.01); *G02B 6/001* (2013.01); *G02B 6/0045* (2013.01); *B60K 2350/206* (2013.01)

(58) Field of Classification Search
USPC ........................................................ 362/611
See application file for complete search history.

(56) References Cited

FOREIGN PATENT DOCUMENTS

| | | | |
|---|---|---|---|
| JP | 2002144956 A | 5/2002 |
| JP | 2003207372 A | 7/2003 |
| JP | 2004-288584 A | 10/2004 |
| JP | 2006-100009 A | 4/2006 |
| JP | 2011129250 A | 6/2011 |
| WO | 2009/110476 A1 | 9/2009 |

\* cited by examiner

RING-SHAPED LIGHT-CONDUCTING APPARATUS WITH UNIFORM LUMINANCE

CROSS-REFERENCE TO RELATED APPLICATIONS

This is a national phase application based on the PCT International Patent Application No. PCT/JP2013/077572 filed Oct. 10, 2013, claiming priority to Japanese Patent Application No. 2012-227635 filed Oct. 15, 2012, the entire contents of both of which are incorporated herein by reference.

TECHNICAL FIELD

The present invention relates to a light-conducting apparatus which may be called a light-directing apparatus or a light-guiding apparatus.

BACKGROUND

As illustrated in FIGS. 8 and 9, Patent Document 1 discloses a light-conducting apparatus 1 including a single light source 2 and a light-conducting member 3. The light-conducting member 3 includes a ring-shaped portion 3a and a tangentially extending portion 3c located radially outside the ring-shaped portion 3a and extending in a tangential direction of the ring-shaped portion 3a from the ring-shaped portion 3a. The ring-shaped portion 3a extends continuously over an entire circumference of the ring-shaped portion in a circumferential direction of the ring-shaped portion. The tangentially extending portion 3c causes light having entered the light-conducting member 3 through a light-receiving surface 3b to enter the ring-shaped portion 3a in an only one direction D in the circumferential direction of the ring-shaped portion 3a.

The light having entered the ring-shaped portion 3a in the one direction D is totally reflected at a radially outside boundary surface of the ring-shaped portion 3a between the ring-shaped portion 3a and air outside the ring-shaped portion 3a, and travels in the ring-shaped portion 3a in the one direction D. The light having entered the ring-shaped portion 3a is diffused at a radially inner surface 3d of the ring-shaped portion 3a which is surface-treated. Therefore, the ring-shaped portion 3a illuminates in a shape of a ring.

PROBLEMS TO BE SOLVED

However, there are the following problems with the conventional light-conducting apparatus 1:

Every time reflection and diffusion occur, the light traveling in the ring-shaped portion 3a in the one direction D is attenuated. Therefore, the larger a distance from the tangentially extending portion 3c along the ring-shaped portion, the weaker the luminance of the ring-shaped portion 3a. As a result, in FIG. 9, a large difference in luminance will occur between a first portion 3e closest to the tangentially extending portion 3c along the ring-shaped portion 3a and a second portion 3f farthest from the tangentially extending portion 3c along the ring-shaped portion 3a. Since the ring-shaped portion 3a is shaped in the form of a ring, which is continuous over the entire circumference of the ring-shaped portion in the circumferential direction of the ring-shaped portion, the first portion 3e and the second portion 3f are adjacent to each other, whereby the difference in luminance between the first portion 3e and the second portion 3f is easily recognized to degrade the appearance.

RELATED ART DOCUMENT

Patent Document

Document 1: Patent Publication No. JP2006-100009

BRIEF SUMMARY

An object of the invention is to provide a light-conducting apparatus where a luminance of a ring-shaped portion is more uniformed over an entire circumference of the ring-shaped portion than in the conventional apparatus.

MEANS FOR SOLVING THE PROBLEMS

The present invention for achieving the above object is as follows:

(1) (Corresponding to First and Second Embodiments (hereinafter, Embodiments 1 and 2) which will be described later)

A light-conducting apparatus comprises a light source, a light-conducting member and a light-reflecting structure.

The light-conducting member includes a ring-shaped portion, a light-receiving surface and a radially outwardly bulged portion.

The ring-shaped portion extends continuously over an entire circumference of the ring-shaped portion in a circumferential direction of the ring-shaped portion.

The light-receiving surface causes light from the light source to enter the light-conducting member through the light-receiving surface.

The radially outwardly bulged portion is bulged radially outwardly from the ring-shaped portion and causes the light having entered the light-conducting member through the light-receiving surface to enter the ring-shaped portion in one direction in the circumferential direction of the ring-shaped portion.

The light-reflecting structure reflects a portion of the light having entered the light-conducting member through the light-receiving surface and causes the reflected light to enter the ring-shaped portion in a direction opposite to the one direction in the circumferential direction of the ring-shaped portion.

(2) (Corresponding to Embodiments 1 and 2)

A light-conducting apparatus according to item (1) above, wherein the light-reflecting structure includes a layer provided at the radially outwardly bulged portion and a boundary surface located between the light-conducting member and the layer. A refractive index of the layer is different from a refractive index of the light-conducting member.

The portion of the light having entered the light-conducting member through the light-receiving surface is reflected at the boundary surface.

(3) (Corresponding to Embodiments 1 and 2)

A light-conducting apparatus according to item (2) above, wherein a medium of the layer is air.

(4) (Corresponding to Embodiment 1 only)

A light-conducting apparatus according to item (2) above, wherein an entirety of the light having entered the light-conducting member through the light-receiving surface and traveling to the boundary surface is reflected at the boundary surface.

(5) (Corresponding to Embodiment 2 only)

A light-conducting apparatus according to item (2) above, wherein a portion of the light having entered the light-conducting member through the light-receiving surface and traveling to the boundary surface is reflected at the boundary surface and a remainder of the light is refracted at the boundary surface to enter the layer.

TECHNICAL ADVANTAGES

According to the light-conducting apparatus of item (1) above, since the light-reflecting structure is provided, it is possible to cause the light having entered the light-conducted member through the light-receiving surface to enter the ring-shaped portion in opposite directions in the circumferential direction of the ring-shaped portion. Therefore, luminance of the ring-shaped portion can be more uniformed over the entire circumference of the ring-shaped portion than that of the (conventional) apparatus where the light-reflecting structure is not provided.

According to the light-conducting apparatus of item (2) above, since the light-reflecting structure includes the layer provided at the radially outwardly bulged portion and the boundary surface between the light-conducting member and the layer, the light-reflecting structure is provided not at the ring-shaped portion but at the radially outwardly bulged portion. Therefore, a luminance change in the ring-shaped portion due to the light-reflecting structure is less liable to be generated than in a case where the light-reflecting structure is provided at the ring-shaped portion. As a result, luminance in the ring-shaped portion can be substantially uniformed over the entire circumference of the ring-shaped portion.

According to the light-conducting apparatus of item (3) above, since the medium of the layer is air, a manufacturing cost of the light-conducting apparatus can be more decreased than that in a case where the medium of the layer is not air.

According to the light-conducting apparatus of item (4) above, even in the case where the entirety of the light having entered the light-conducting member through the light-receiving surface and traveling to the boundary surface is reflected at the boundary surface, the technical advantages similar to those obtained in the light-conducting apparatus of item (2) above can be obtained.

According to the light-conducting apparatus of item (5) above, even in the case where the portion of the light having entered the light-conducting member through the light-receiving surface and traveling to the boundary surface is reflected at the boundary surface and the remainder of the light is refracted at the boundary surface to enter the layer, the technical advantages similar to those obtained in the light-conducting apparatus of item (2) above can be obtained.

BRIEF DESCRIPTION OF DRAWINGS

In FIG. 2, a light source is omitted.

DETAILED DESCRIPTION

Figure 3:
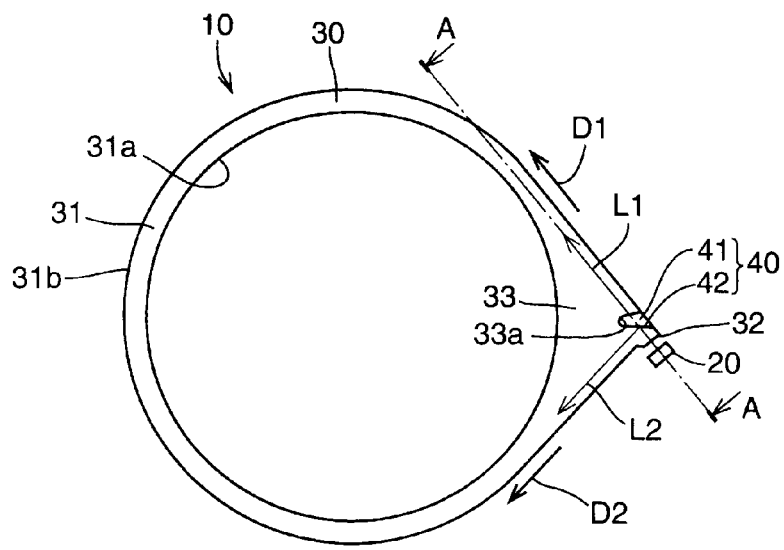
FIG. 3 is a plan view of the light-conducting apparatus according to Embodiment 1 of the present invention.
Figure 4:
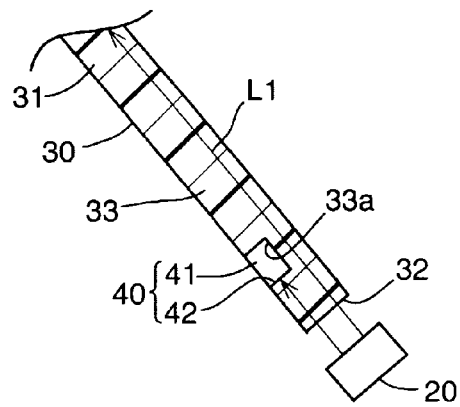
FIG. 4 is an enlarged cross-sectional view taken along line A-A of FIG. 3.
Figure 5:
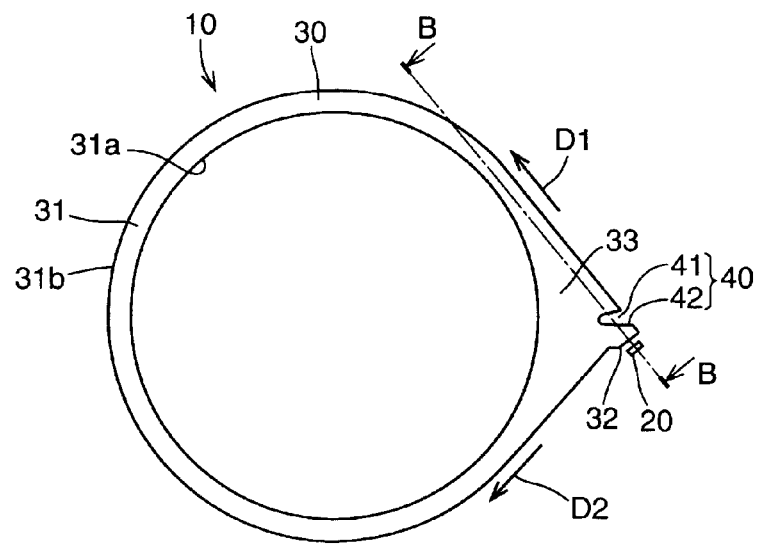
FIG. 5 is a plan view of a light-conducting apparatus according to Embodiment 2 of the present invention.
Figure 6:
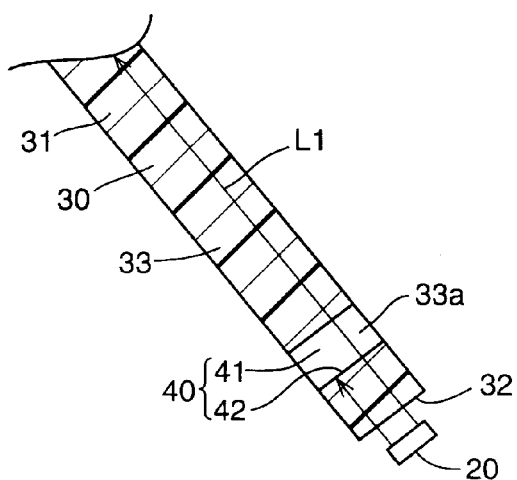
FIG. 6 is an enlarged cross-sectional view taken along line B-B of FIG. 5.
Figure 7:
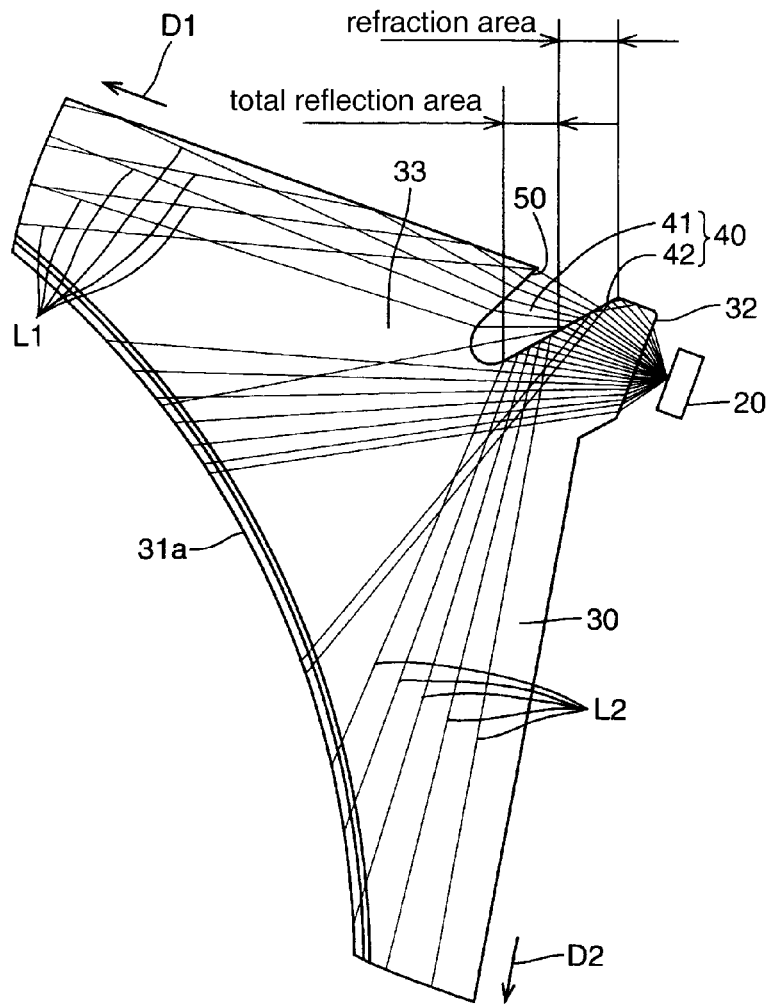
FIG. 7 is a partial enlarged view of a light-reflecting structure and its vicinity of the light-conducting apparatus of FIG. 5.
Figure 8:
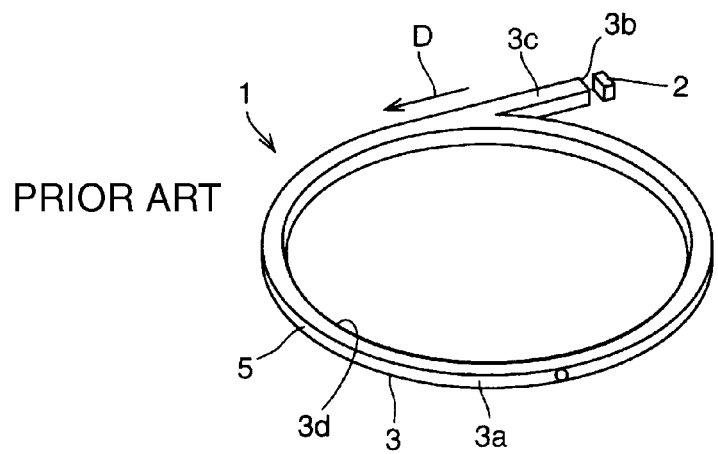
FIG. 8 is an oblique view of a conventional light-conducting apparatus.
Figure 9:
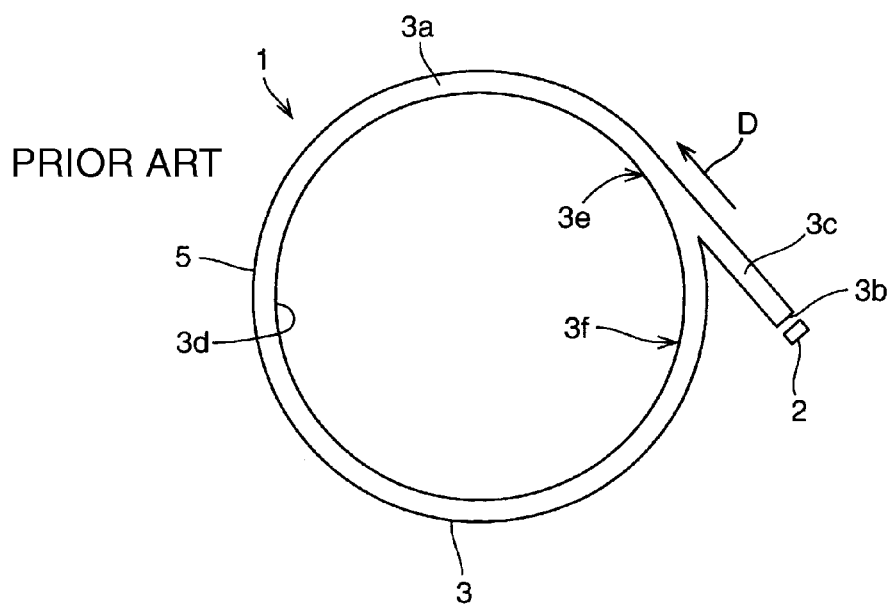
FIG. 9 is a plan view of the conventional light-conducting apparatus.

FIGS. 1-4 illustrate a light-conducting apparatus according to Embodiment 1 of the present invention and FIGS. 5-7 illustrate a light-conducting apparatus according to Embodiment 2 of the present invention.

Portions common to Embodiments 1 and 2 of the present invention are denoted with the same reference numerals throughout Embodiments 1 and 2 of the present invention. First, portions common over Embodiments 1 and 2 of the present invention will be explained.

A light-conducting apparatus 10 according to any embodiment of the present invention can be used for, for example, a ring-shaped illumination apparatus such as a cup holder of a vehicle. The light-conducting apparatus 10 may be used for a ring-shaped interior apparatus of a vehicle such as a speaker grille or a register grille. The light-conducting apparatus 10 may be provided at a box of a vehicle, such as a console box of a vehicle.

Figure 1:
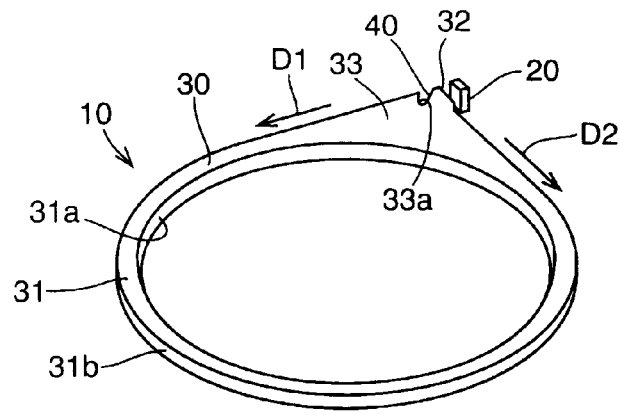
FIG. 1 is an oblique view of a light-conducting apparatus according to Embodiment 1 of the present invention.
Figure 2:
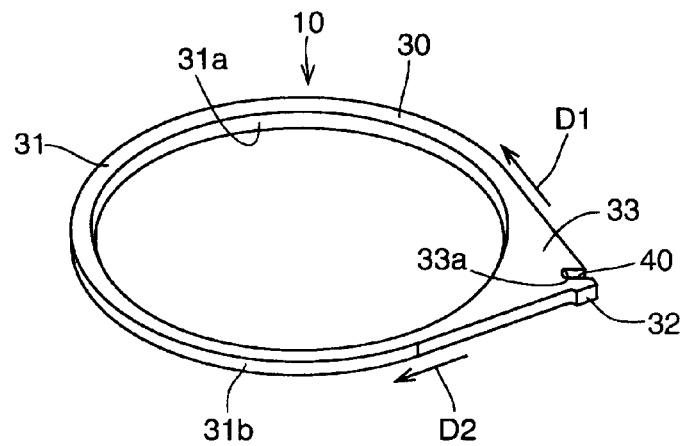
FIG. 2 is an oblique view of the light-conducting apparatus according to Embodiment 1 of the present invention viewed in a direction different from FIG. 1.

As illustrated in FIG. 1, the light-conducting apparatus 10 includes a light source 20, a light-conducting member 30 and a light-reflecting structure 40.

A single light source 20 is provided. The light source 20 may be, for example, a LED (light emitting diode), a bulb or the like. Among them, the LED is preferable. This is because a size of the LED is smaller than that of the bulb, so that the apparatus 10 can be made smaller. Further, this is because heat generation of the LED is smaller than that of the bulb, whereby heat damage to a member located adjacent the light source (for example, the light-conducting member 30) can be decreased.

The light-conducting member 30 is made from, for example, material in which light can pass. Such material is, for example, polycarbonate resin or acrylics resin. The light-conducting member 30 is formed in a single plane. For decreasing the number of parts of the light-conducting apparatus 10, it is desirable that the light-conducting member 30 is formed as a single-part member. The light-conducting member 30 is a molded product.

The light-conducting member 30 includes a ring-shaped portion 31, a light-receiving surface 32 and a radially outwardly bulged portion 33.

A single ring-shaped portion 31 is provided. The ring-shaped portion 31 extends continuously over an entire circumference of the ring-shaped portion in a circumferential direction of the ring-shaped portion. In a plan view, the ring-shaped portion 31 may be circular or elliptical. In a cross-sectional view, the ring-shaped portion 31 may be, for example, rectangular. A radially inner surface 31a of the ring-shaped portion 31 is surface-treated (for example, embossed) so that a light travelling in the ring-shaped portion 31 is diffused at the radially inner surface 31a.

Light having entered the ring-shaped portion 31 is totally reflected at a radially outside boundary surface 31b of the ring-shaped portion 31 between the ring-shaped portion 31 and air outside the ring-shaped portion 31, and travels in the ring-shaped portion 31 in the circumferential direction of the ring-shaped portion 31. The light having entered the ring-shaped portion 31 is diffused at the radially inside surface-treated surface 31a of the ring-shaped portion 31. Therefore, the radially inner surface 31a of the ring-shaped portion 31 illuminates over the entire circumference of the ring-shaped portion 31 in a shape of a ring.

The light-receiving surface 32 is provided in order to cause light from the light source 20 to enter the light-conducting member 30 through the light-receiving surface. The light-receiving surface 32 is provided at the radially outwardly bulged portion 33 so that a luminance change in the ring-shaped portion 31 caused by the light-receiving surface 32 is unlikely to occur. It is preferable that the light-receiving surface 32 is provided at a portion farthest from the ring-shaped portion 31 in the radially outwardly bulged portion 33. A single light-receiving surface 32 is provided. The light-receiving surface 32 opposes the light source 20. The light-receiving surface 32 is located away from the light source 20 so that heat damage due to the light source 20 can be suppressed. The light-receiving surface 32 may be flat, convex or concave.

The radially outwardly bulged portion 33 bulges (protrudes) radially outwardly from a portion of the ring-shaped portion 31. In the plan view, the ring-shaped portion 31 is a substantially isosceles triangle except the portion of the ring-shaped portion 31. When the light-conducting member 30 is made from polycarbonate resin, it is desirable that an angle of a vertex of the isosceles triangle farthest from the portion of the ring-shaped portion 31 is within a range from 90 degrees to 102 degrees. This is because, if the angle of the vertex is smaller than 90 degrees, a size in a radial direction of the radially outwardly bulged portion 33 is large (long), whereby a manufacturing cost of the light-conducting apparatus 10 is increased. When the light-conducting member 30 is made from material other than polycarbonate resin, such as acrylics resin, a refractive index of which is different from that of polycarbonate resin, the desirable angle of the vertex is changed from that desirable angle of the vertex in the case of polycarbonate resin. A single radially outwardly bulged portion 33 is provided. The radially outwardly bulged portion 33 causes the light having entered the radially outwardly bulged portion 33 of the light-conducting member 30 through the light-receiving surface 32 to enter the ring-shaped portion 31 in one direction D1 in the circumferential direction of the ring-shaped portion 31.

As illustrated in FIG. 3, the light-reflecting structure 40 reflects only a portion (not an entirety) of the light having entered the light-conducting member 30 through the light-receiving surface 32 and causes the reflected light to enter the ring-shaped portion 31 in a direction D2 opposite to the one direction D1 in the circumferential direction of the ring-shaped portion 31. At least a portion of the light having entered the light-conducting member 30 through the light-receiving surface 32 is divided, at the light-reflecting structure 40, into a light L1 entering the ring-shaped portion 31 in the one direction D1 and a light L2 entering the ring-shaped portion 31 in the opposite direction D2. When the ring-shaped portion 31 is circular in the plan view, the light L1 and the light L2 are directed to enter the ring-shaped portion 31 in tangential directions, opposite to each other, of the ring-shaped portion 3.

The light-reflecting structure 40 reflects the portion of the light having entered the light-conducting member 30 through the light-receiving surface 32 before entering the ring-shaped portion 31. The light-reflecting structure 40 includes a layer 41 and a boundary surface 42.

The layer 41 is provided at the radially outwardly bulged portion 33. A single layer 41 is provided. A refractive index of the layer 41 is different from a refractive index of the light-conducting member 30. The refractive index of the layer 41 is smaller than the refractive index of the light-conducting member 30 so that light can be totally reflected at the boundary surface 42. A medium of the layer 41 is, for example, air. As illustrated in FIG. 4, the layer 41 is formed at a portion of the radially outwardly bulged portion 33. The layer 41 is a notch (concave notch) 33a concave from a surface of the radially outwardly bulged portion 33.

The boundary surface 42 is a surface which opposes the light-receiving surface 32 among boundary surfaces between the radially outwardly bulged portion 33 and the layer 41. The boundary surface 42 may be flat or curved. As illustrated in FIG. 3, a portion of the light having entered the light-conducting member 30 through the light-receiving surface 32 is reflected at the boundary surface 42. Only a light (ray) whose incidence angle (an angle between a direction perpendicular to the boundary surface 42 and the light (ray) traveling to the boundary surface 42) exceeds a critical angle, among the light (rays) having entered the light-conducting member 30 through the light-receiving surface 32 and traveling to the boundary surface 42, is totally reflected at the boundary surface 42 without entering the layer 41. For decreasing the number of parts of the light-conducting apparatus, a part such as a film for reflecting the light is not provided at the boundary surface 42.

An entirety of the light having entered the light-conducting member 30 through the light-receiving surface 32 and traveling to the boundary surface 42 may be reflected at the boundary surface 42 (Embodiment 1). A portion of the light having entered the light-conducting member 30 through the light-receiving surface 32 and traveling to the boundary surface 42 may be reflected at the boundary surface 42 and a remainder of the light may be refracted at the boundary surface 42 to enter the layer 41 (Embodiment 2).

Next, operation and technical advantages common to Embodiment 1 and Embodiment 2 of the present invention will be explained.

The light issued from the light source 20 enters the light-conducting member 30 through the light-receiving surface 32. If the light-reflecting structure is not provided, the light having entered the light-conducting member 30 will travel through the radially outwardly bulged portion 33 and will enter the ring-shaped portion 31 in one direction D1. However, since the light-reflecting structure 40 is provided at the light-conducting apparatus 10, a portion of the light having entered the light-conducting member 30 is reflected at the light-reflecting structure 40 and enters the ring-shaped portion 31 in a direction D2 opposite the one direction D1. Therefore, the light having entered the light-conducting member 30 through the light-receiving surface 32 can be divided into two portions, which include the light L1 entering the ring-shaped portion 31 in the one direction D1 and the light L2 entering the ring-shaped portion 31 in the opposite direction D2. As a result, luminance of the ring-shaped portion can be more uniform over the entire circumference of the ring-shaped portion than that of the (conventional) case where the light-reflecting structure is not provided.

Since the light-reflecting structure 40 includes the layer 41 provided at the radially outwardly bulged portion 33 and the boundary surface 42 between the light-conducting member 30 and the layer 41, the light-reflecting structure 40 is located not at the ring-shaped portion 31 but at the radially outwardly bulged portion 33. Therefore, a luminance change in the ring-shaped portion 31 caused by the light-reflecting structure 40 is less liable to occur than in a case where the light-reflecting structure 40 is provided at the ring-shaped portion 31. As a result, luminance in the ring-shaped portion 31 can be uniformed over the entire circumference of the ring-shaped portion.

Since the medium of the layer 41 is air, a manufacturing cost of the light-conducting apparatus can be more decreased than that in a case where the medium of the layer 41 is not air.

Next, portions unique to each embodiment of the present invention will be explained.

Embodiment 1

FIGS. 1-4

In Embodiment 1 of the present invention, the entirety of the light having entered the light-conducting member 30 through the light-receiving surface 32 and traveling to the boundary surface 42 is reflected at the boundary surface 42.

As illustrated in FIG. 4, the boundary surface 42 is provided at only a portion of the radially outwardly bulged portion 33 in a thickness direction of the radially outwardly bulged portion 33 (in a direction perpendicular to the direction in which the light travels through the radially outwardly bulged portion 33, i.e., an axial direction of the ring-shaped portion 31). Therefore, the layer 41 and the notch 33 for forming the layer 41 are provided at only a portion of the radially outwardly bulged portion 33 in the thickness direction of the radially outwardly bulged portion 33.

Next, operation and technical advantages unique to Embodiment 1 of the present invention will be explained.

(a) As illustrated in FIG. 3, the light having entered the light conducting member 30 through the light-receiving surface 32 and traveling to the boundary surface 42 is reflected at the boundary surface 42 and becomes the light L2 entering the ring-shaped portion 31 in the direction D2 opposite to the one direction D1. (b) The light having entered the light conducting member 30 through the light-receiving surface 32 and not traveling to the boundary surface 42 is the light L1 entering the ring-shaped portion 31 in the one direction D1.

Therefore, even in the case where the entirety of the light having entered the light-conducting member 30 through the light-receiving surface 32 and traveling to the boundary surface 42 is reflected at the boundary surface 42, the light having entered the light-conducting member 30 through the light-receiving surface 32 can be divided into two portions, more particularly, into the light L1 and the light L2.

The boundary surface 42 (the layer 41, the notch 33) is provided at a half of the radially outwardly bulged portion 33 in the thickness direction of the radially outwardly bulged portion 33, so that an amount of the light L1 and an amount of the light L2 can be made equal to each other. Therefore, luminance of the ring-shaped portion 31 can be uniform over the entire circumference of the ring-shaped portion.

Embodiment 2

FIGS. 5-7

As illustrated in FIG. 7, in Embodiment 2 of the present invention, a portion of the light having entered the light-conducting member 30 through the light-receiving surface 32 and traveling to the boundary surface 42 is reflected at the boundary surface 42 and the remainder of the light is refracted at the boundary surface 42 to enter the layer 41.

As illustrated in FIG. 6, the boundary surface 42 is provided at the entirety of the radially outwardly bulged portion 33 in the thickness direction of the radially outwardly bulged portion 33 (in the direction perpendicular to the direction in which the light travels through the radially outwardly bulged portion 33, i.e., in the axial direction of the ring-shaped portion 31). Therefore, the layer 41 and the notch 33 for forming the layer 41 are provided at the entirety of the radially outwardly bulged portion 33 in the thickness direction of the radially outwardly bulged portion 33.

Next, operation and technical advantages unique to Embodiment 2 of the present invention will be explained.

(a) An incidence angle of a portion of the light having entered the light-conducting member 30 through the light-receiving surface 32 and traveling to the boundary surface 42 is larger than the critical angle. Therefore, as illustrated in FIG. 7, the portion of the light is totally reflected at the boundary surface 42 and enters in the ring-shaped portion 31 in the direction D2 opposite to the one direction D1. (b) An incidence angle of the remainder of the light having entered the light-conducting member 30 through the light-receiving surface 32 and traveling to the boundary surface 42 is smaller than the critical angle. Therefore, a portion of the remainder of the light is refracted at the boundary surface 42 to enter the layer 41. The light having entered the layer 41 travels through the layer 41, is refracted at a second boundary surface 50 different from the boundary surface 42, enters the radially outwardly bulged portion 33 again and becomes the light L1 entering in the ring-shaped portion 31 in the one direction D1.

Therefore, even in the case where a portion of the light having entered the light-conducting member 30 through the light-receiving surface 32 and traveling to the boundary surface 42 is reflected at the boundary surface 42 and the remainder of the light is refracted at the boundary surface 42 to enter the layer 41, the light having entered the light-conducting member 30 through the light-receiving surface 32 can be divided into two portions, more particularly, into the light L1 and the light L2.

By setting the angle of the boundary surface 42 to an angle where a light traveling to a half area of the boundary surface 42 is reflected at the boundary surface 42 and a light traveling to the other half area of the boundary surface 42 is refracted at the boundary surface 42 to enter the layer 41, an amount of the light L1 and an amount of the light L2 can be made substantially equal to each other. Therefore, luminance of the ring-shaped portion 31 can be uniform over the entire circumference of the ring-shaped portion.

EXPLANATION OF REFERENCE NUMERALS

10 light-conducting apparatus
20 light source
30 light-conducting member
31 ring-shaped portion
32 light-receiving surface
33 radially outwardly bulged potion 33a notch
40 light-reflecting structure
41 layer
42 boundary surface
D1 one direction in a circumferential direction of the ring-shaped portion
D2 direction opposite to the one direction in the circumferential direction of the ring-shaped portion
L1, L2 light

The invention claimed is:

1. A light-conducting apparatus comprising:
a light source,
a light-conducting member, and
a light-reflecting structure,
wherein the light-conducting member includes a ring-shaped portion, a light-receiving surface and a radially outwardly bulged portion,
wherein the ring-shaped portion extends continuously over an entire circumference of the ring-shaped portion in a circumferential direction of the ring-shaped portion,
wherein the light-receiving surface causes light from the light source to enter the light-conducting member through the light-receiving surface,
wherein the radially outwardly bulged portion protrudes in a radial direction beyond the circumference of the ring-shaped portion outwardly from the ring-shaped portion such that the light-receiving surface is provided in a radial direction beyond the circumference of the ring-shaped portion outwardly away from the ring-shaped portion and the light having entered the light-conducting member through the light-receiving surface enters the ring-shaped portion in one direction in the circumferential direction of the ring-shaped portion, and
wherein the light-reflecting structure reflects a portion of the light having entered the light-conducting member through the light-receiving surface and causes the reflected light to enter the ring-shaped portion in a direction opposite to the one direction in the circumferential direction of the ring-shaped portion.

2. A light-conducting apparatus according to claim 1,
wherein the light-reflecting structure includes a layer provided at the radially outwardly bulged portion and a boundary surface located between the light-conducting member and the layer, a refractive index of the layer being different from a refractive index of the light-conducting member, and
wherein the portion of the light having entered the light-conducting member through the light-receiving surface is reflected at the boundary surface.

3. A light-conducting apparatus according to claim 2, wherein a medium of the layer is air.

4. A light-conducting apparatus according to claim 3, wherein the layer is a notch concave from a surface of the radially outwardly bulged portion.

5. A light-conducting apparatus according to claim 2, wherein an entirety of the light having entered the light-conducting member through the light-receiving surface and traveling to the boundary surface is reflected at the boundary surface.

6. A light-conducting apparatus according to claim 2, wherein a portion of the light having entered the light-conducting member through the light-receiving surface and traveling to the boundary surface is reflected at the boundary surface and a remainder of the light is refracted at the boundary surface to enter the layer.

7. A light-conducting apparatus according to claim 1, wherein the radially outwardly bulged portion protrudes radially outwardly from the ring-shaped portion such that the light having entered the light-conducting member through the light-receiving surface enters the ring-shaped portion in the one, tangential direction in the circumferential direction of the ring-shaped portion, and
wherein the light-reflecting structure reflects the one portion, not an entirety of the light having entered the light-conducting member through the light-receiving surface and causes the reflected light to enter the ring-shaped portion in the direction tangential and opposite to the one, tangential direction in the circumferential direction of the ring-shaped portion.

* * * * *